Oct. 27, 1964    J. S. FREISMUTH ETAL    3,153,933
POWER ELEMENT
Filed Oct. 22, 1962

INVENTORS
John S. Freismuth
BY Steven J. Jancovic
Fidler, Beardsley & Bradley
ATTORNEYS

United States Patent Office 3,153,933
Patented Oct. 27, 1964

1

3,153,933
POWER ELEMENT
John S. Freismuth and Steven J. Jancovic, Arlington Heights, Ill., assignors to Sterling Automotive Manufacturing Company, Elk Grove Village, Ill., a corporation of Illinois
Filed Oct. 22, 1962, Ser. No. 232,236
26 Claims. (Cl. 73—368.3)

This invention relates to power elements of the type that are operated by pressure changes of a contained pressure-producing material. The pressure-producing material may be a thermally expandable material or a hydraulic material. Power elements of this type are used for operating such devices as switches and valves.

In any power element of this type, a critical problem is that of sealing the power element to prevent the thermally expansible material or hydraulic material from escaping from the chamber in which it is disposed and to prevent introduction of the ambient heat producing medium into the chamber. For example, in thermal elements of this type a diaphragm or force-transmitting member constructed of elastomeric or other rubber-like material closes one end of the chamber of the heat conductive casing in which the expansible or hydraulic material is disposed. Upon temperature rise, the expansible or hydraulic material expands to cause movement of the diaphragm or force transmitting member which acts against a plunger housed in a guide member carried by the casing of the expansible or hydraulic material to move the plunger. Movement of the plunger then causes operation of a switch, valve or the like.

In addition to the problem of sealing, particularly sealing of the diaphragm or force-transmitting member, another problem associated with "squeeze-push" type of power elements is that of the possible jamming or improper guiding and binding of the movable plunger with other parts of the assembly, thus presenting a damage hazard to the assembly and associated parts.

With the present invention, the aforementioned problems and difficulties of the prior art are substantially overcome by the provision of a power element assembly having a double-flanged, force-transmitting member which cooperates with the other parts of the assembly including a pair of spaced plates to hermetically seal the chamber containing the expansible or hydraulic material.

It is, therefore, an object of the present invention to provide a new and improved power element.

Another object of the present invention is to provide a new and improved power element incorporating sealing grooved parts and a diaphragm member with a marginal bead compressed between said parts to seal the chamber of the power element in which an expansible or hydraulic material is disposed.

Another object of the present invention is to provide a power element having a new and improved force-transmitting member constructed of elastomeric or other rubber-like material.

Still another object of the present invention is to provide a force-transmitting member for power elements.

A further object of the present invention is to provide a force-transmitting member for power elements having a pair of spaced sealing flanges.

A still further object of the present invention is to provide a new and improved "squeeze-push" type of power element so constructed that the possibility of jamming or improper guiding of the plunger during operation is minimized.

Another object of the present invention is to provide a power element which is simple and compact in construction and efficient in operation.

These and other objects, features and advantages of

2 the present invention will become readily apparaent from a careful consideration of the following detailed description, when considered in conjunction with the accompanying drawing, illustrating preferred embodiments of the present invention, wherein like reference numerals and characters refer to like and corresponding parts throughout the several views, and wherein:

Figure 1:
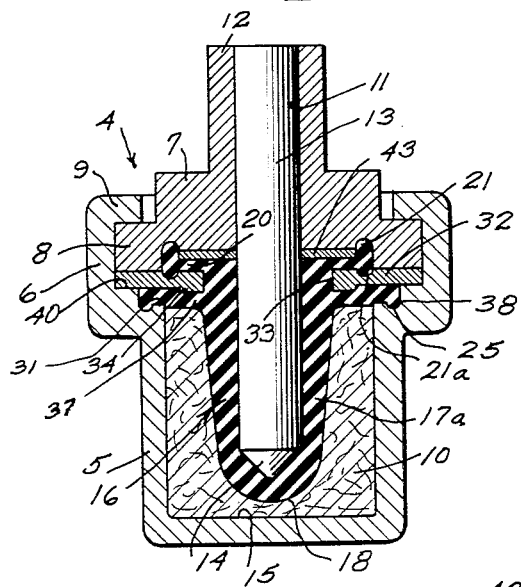
FIG. 1 is an enlarged view in vertical section of a power element constructed in accordance with the principles of the present invention.

Referring to FIG. 1 there is shown a power element of the "squeeze-push" type, generally indicated by the numeral 4, comprising a metal cup member, container, or casing 5, constructed preferably of a material having a high heat conductivity, such as brass, and having a surrounding flange of rim 6 secured to which is a guide member 7. The guide member 7 is stepped to provide a radial annular flange 8 which is secured to the casing 5 by an inturned and bent over flange extension 9 of the rim 6.

The casing 5 has disposed therein a thermally-expandable pressure-producing material 10 which may be any of several materials, such as paraffin or the thermal material disclosed in United States Patent No. 1,259,846. It will be appreciated that the exact composition of the material 10 is determined in accordance with the desired operating characteristics of the power element. The guide member 7 is provided with a passageway or axial bore 11 which opens at the end wall 12 of the guide. A cylindrical and movable piston 13 having a conical end 14 extends through the passageway 11 and into the casing 5 to a point adjacent the bottom wall 15 of the casing 5.

Surrounding the piston 13 in the casing and adjacent the bottom wall 15 of the casing 5 is a body of force-transmitting material 16 formed of vulcanized rubber or other similar deformable material. The force-transmitting body 16 is of generally conical configuration and has an open end 17 and a conical body portion 17a which terminates in a dome-like head end 18.

Figure 2:
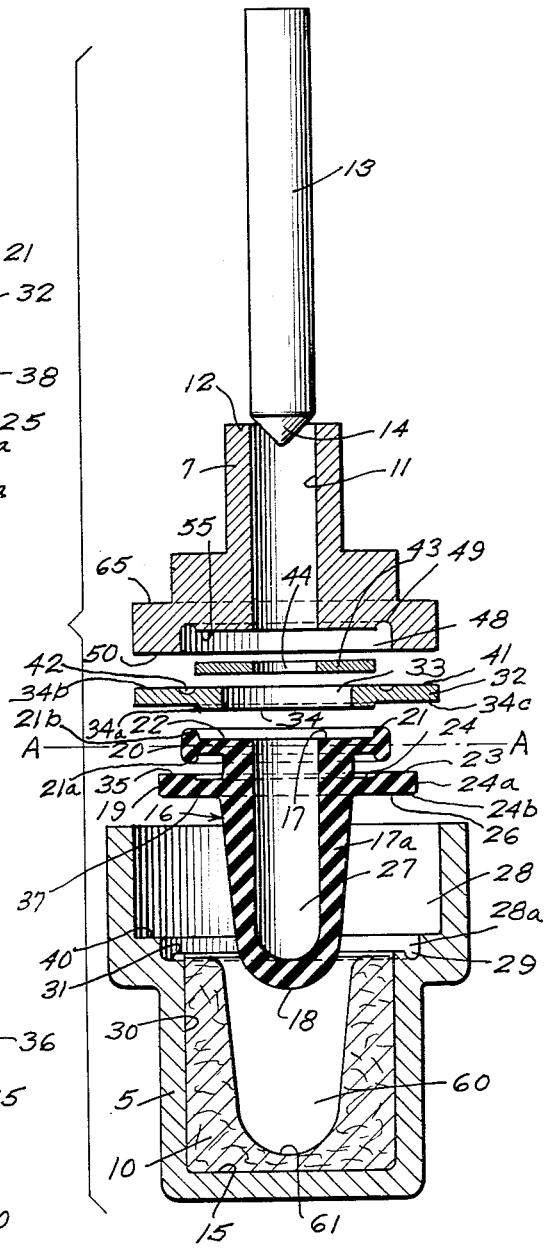
FIG. 2 is an exploded view of the power element of FIG. 1.

As appears in FIG. 2, the force-transmitting body 16 carries at its end 17 remote from the casing end wall 15 a pair of spaced inner and outer annular sealing flanges, flanges 19 and 20, respectively. The inner flange 19 has a greater diameter than the outer flange 20.

The outer sealing flange 20 defines the end 17 of the body 16 and carries an annular sealing bead at the outer margin thereof to define a channel-shaped upper surface 22. The marginal bead 21 extends perpendicularly and both above and below the horizontal axis "A" of the flange 20 for purposes more fully hereinafter set forth.

The inner flange 19 has a flat upper surface 23 inwardly annularly recessed to provide an upper channel 24. The lower surface 26 of the flange 19 is generally flat.

The body 16 has an axial bore or passageway 27 for receiving the plunger 13 and which is open at the end 17 and which terminates inwardly of the end 18.

Referring to FIG. 2, the casing or container 5, before the marginal edge of the rim 6 is inwardly turned to form the flange 9 (FIG. 1), forms a chamber 28 which communicates with an annular counterbore recess 28a having a sealing groove 29 formed therein inwardly of the chamber 28. The sealing groove 29 is provided to receive a marginal bead 25 (FIG. 1) which is formed of the edge of the flange 19 when the flange 19 is squeezed during assembly of the thermal element (FIG. 1). It will be observed that the groove 29 and the wall 30 of the casing 5 form an annular upwardly facing shoulder 31 on which a portion of the flange 19 rests after the power element is assembled.

A retaining plate 32 (FIG. 2) having a central bore 33 of greater diameter than the bore 11 of the guide member and bore 27 of the body 16, but axially aligned therewith, is provided to reinforce the lower flange 19 when in assembled relation and to maintain the flanges 19 and 20 in spaced apart relation. The retaining member 32 is sized to the inner wall of the chamber 28 of the casing and is snugly fitted therein for aligning of the body 16 when assembled with the plate 32. The retaining plate 32 has a raised annular lower flange or boss 34 which has a tapered outer wall 34a. The flange 34 is sized to seat in the recess 24 of the force-transmitting body 16 (FIG. 1). During assembly of the thermal element, the portion 34b of the plate 32 which extends outwardly from the flange 34 will deform the top surface 35 of the flange 19 and cooperates with the groove 29 and shoulder 31 of the casing 5 to form the bead 25 of the flange 19 which seats in the groove 29.

It will be observed from FIG. 1 that the shoulder 31 of the casing 5 cooperates with the flange 34 of the retaining member 32 not only to form the bead 25 in the groove 29 but also cooperates therewith to form from the edge of the flange 19 an upper sealing bead type flange 36 which is in general alignment with the bead 25. The assembly-formed bead 25 and assembly-formed bead 36 are joined, when the casing and guide member are assembled, to the remainder of the flange 19 by a compressed and reduced neck portion 37 which is of lesser dimension than the cross-sectional dimension of the flange 19 of the unassembled body 16 appearing in FIG. 2.

Thus, assembly of the power element thus forms the marginal bead 25, flat-topped marginal bead 36 and a vertical flat marginal side wall 38 which is common to both beads 25 and 36. Outward from the groove 29, the retaining member 32 seats on a shoulder 40 provided by the rim 6 (FIG. 1).

Inward of the outer edge of the plate 32, the upper surface 41 of the retaining member 32 is provided with an annular groove 42 to receive the bottom portion 21a of the annular marginal sealing bead 21. Preferably, the body 16 is molded to the plate 32 before assembly of the casing and guide member and with the flange 34 of the plate 32 molded to the top surface 35 of the bottom flange 19, with the flange 34 seated in the annular channel recess 24 and with the lower portion 21a of the bead 21 seated in the groove 42 of the plate 32. The pre-assembled plate 32 and body 16 may thereafter be assembled with the other parts of the power element.

The lower surface of the guide member 7 is provided with a counterbore 48 which has an annular groove 49, the counterbore 48 being aligned with the bore 11 and the groove 49 being aligned with the groove 42. The counterbore 48 is provided to receive an apertured anti-extrusion disc or plate 43 which is dimensioned to seat in the disc-shaped portion 22 of the flange 20 of the force-transmitting body 16, as clearly appears in FIG. 1. The flange 8 of the guide member 7 has a lower end surface 50 which seats on the facing upper surface 41 of the plate 32, when assembled, with the lower portion 21a of the bead 21 seated in the groove 42 of the plate 32 and with the upper portion 21b thereof seated in the groove 49 of the guide 7. The anti-extrusion plate 43 prevents extrusion of the bead 21 inwardly and of the flange 20 along the bore 11 and cooperates with the abutting shoulder defined by the internal bottom wall 55 of the counterbore 48 and plate 32 to compress the flange 20 inwardly of the bead 21.

In a preferred method of assembly of the power element 4, the casing 5 is first formed with the rim 6. The cup 5 is then formed to provide the annular sealing groove 29 and then the expansible, contractible material 10, such as that disclosed in Patent No. 2,368,181, is inserted in the chamber defined by the casing 5. The expansible material 10 is disposed in the container to fill the container 5 to a level corresponding generally with the bottom of the groove 29. The material 10 is shaped to provide a conical pocket 60 sized to the external configuration of the body 16.

The body 16 is preferably premolded to the plate 32, and in the molding process, the sealing flanges 19 and 20 are formed, flange 20 being formed with the bead 21 in the groove 42 of the plate 32 and flange 34 in the recess 24 of the flange 19.

The plate-carrying body 16 is then inserted in the casing 5 so that the end 18 thereof fits snugly against the surface 61 (FIG. 2) of the material 10 with a portion 24b of the sealing flange 19 overlying the groove 29 and with the bottom surface 34c of plate 32 disposed above the internal surface 40 of the rim 6.

The anti-extrusion plate 43 is then disposed in the channel 22 of the flange 20. Next, the plunger 13 is inserted in the guide member 7 so that it passes through the aperture 44 of the plate 43, and is snugly fitted in the bore 27 of the body 16 with the conical end 14 thereof in the pocket of the bore 27 provided therefor. The guide member flange 8 is seated on the top surface 41 of the plate 32 so that the bead portion 21b of the sealing flange 20 is seated in the groove 49 of the member 7 and the assembly is now ready for bending of the inturned flange 9 to squeeze the flanges 19 and 20 and thereby complete assembly of the power element. For this purpose, the guide member 7 has a top surface 65 of the flange 8, to provide a seat for the inturned flange 9 of the casing 5. The flange 9 may be inturned in any conventional manner.

Turning of the flange 9 inwardly is accomplished in such a manner that the flange 8, and plate 32 are trapped between the flange 9 and the shoulder 40 provided by the rim 6. The pressures applied to the flange 8 and plate 32 are sufficient to deform the flange 19 to form the marginal bead 25, as appears in FIG. 1, and at the same time to deform the flange 19 inward of the bead 24 to provide the neck or reduced portion 37 (FIG. 1). Moreover, the assembly pressure is sufficient to squeeze the bead 21 in grooves 42 and 49 to thereby enhance the sealing effects thereof. It will be appreciated that, due to such deformation, the bead 21 in the grooves 42 and 49 is compacted, thus increasing the sealing effect of the flange 20 and bead 21.

Turning of the rim flange 9 inward also provides means for seating the disc 43 against the bottom surface 55 of the guide member 7, whereby the guide member 7 and disc 43 tend also to squeeze therebetween the portion of the flange 20 located inwardly of the bead 21.

In operation, the thermostatic power element is placed in a medium which will undergo a temperature change. When the temperature of the ambient medium rises above the expansion temperature range of the expansible material 10, the material 10 heats up so as to expand and exert a radial squeezing pressure against the force transmitting body 16. This radial squeezing pressure is transmitted through the body 16 to the conical end 14 of the piston 13 and tends to move the piston upwardly in the bore 27 of the body 16. The force exerted against the body 16 is transmitted to the sealing flanges 19 and 20 and extrusion of the material 10 during expansion of the material 10 is prevented by the cooperative relationship of the rim flange 9, flange 8, flange 34, casing shoulder 40, plate 32, and shoulder 31.

The plate 32 and flange 20, cooperating with the flange 19 and plate 43, provide a labyrinth seal preventing extrusion of the material 10 from the casing and introduction of the ambient medium into the casing. It will be also appreciated that the plate 43 minimizes the possibility of the top surface of the body 16 being pinched between the plunger and guide member as the plunger 13 is moved during operation of the thermal element, since the plate tends to push the top portion of the sealing bead 21 radially outward towards the periphery of the rim 6.

Figure 3:
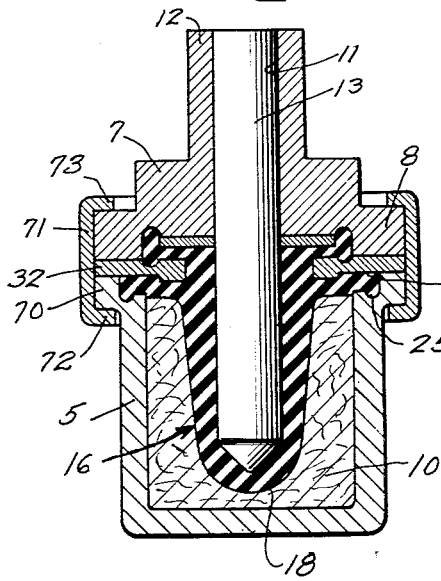
FIG. 3 is a view of another embodiment of a power element constructed in accordance with the principles of the present invention.

In the embodiment of the present invention appearing in FIG. 3, the cup 5 is provided with an outturned annular flange 70 instead of a rim, such as the rim 6 appearing in FIG. 1. A power element assembly clamping member 71 is provided which is a separate sleeve and which is turned inward at both ends, as at 72 and 73 to hold the cup 5 and guide member 7 in assembled relation with the body 16 and plates 32 and 43. The flanges 19 and 20 of the body 16 are compressed to form a sealed power element. The operation of this assembly is similar to the operation of the assembly of FIG. 1, above described.

Thus with the present invention it will be appreciated that a thermal element having a new and improved sealing arrangement for the force transmitting member 16 is provided which not only prevents extrusion of the expansible material 10 from the casing, but also prevents introduction of the ambient heat producing medium into the casing 5. In addition, with the present invention the direction of movement of the piston 13 is substantially linear and the anti-extrusion plate 43, in addition to providing a sealing means, also prevents pinching of the body 16 by the plunger and consequent binding of the plunger. It will be observed that the plate 32 cooperates with the cup 5 and guide member 7 to minimize the possibility of transverse movement of the body 16 towards the side wall of the container 5 which would cause binding of the plunger or piston 13 on its upward travel as the material 10 expands. It will be appreciated that, after the material has expanded to its predetermined limits, the plunger, as viewed in FIG. 1, will have moved upward in a manner of the "squeeze-push" thermal elements of the prior art.

Spring means (not shown) are usually provided to return the plunger to its normal position shown in FIG. 1 after the thermally expansible material 10 has returned to its normal position upon reduction of the temperature of the ambient atmosphere surrounding the container 5 to below the expansion temperature range of such material 10.

Although various minor modifications of the present invention will become readily apparent to those versed in the art, it should be understood that what is intended to be covered by the patent warranted hereon are all such embodiments as reasonably and properly come within the scope of the contribution to the art hereby made.

We claim:

1. A power element comprising a heat conductive casing defining a chamber with an open end for receiving an expansible and contractible, pressure-producing material, said casing having a marginal abutting surface, a guide member having a plunger-receiving bore and a marginal abutting surface overlying the marginal abutting surface of the casing, a spacer member disposed between said casing and said guide member and having a plunger receiving bore and first and second opposed marginal abutting surfaces, an elastic diaphragm member for closing the open end of said chamber which carries a first sealing flange positioned above the spacer member and a second sealing flange positioned below the spacer member, a portion of the first sealing flange spanning a first recess formed between the first abutting surface of the spacer member and the abutting surface of the guide member, a portion of the second sealing flange spanning a second recess formed between the second abutting surface of the spacer member and the abutting surface of the casing a reciprocal plunger in the bore of the guide member and extending through the bore of said spacer member said plunger being movably responsive to movement of the diaphragm member caused by expansion and contraction of a pressure producing material in said chamber and means for securing the guide member and casing to assemble the power element by contacting adjacent ones of said abutting surfaces, whereby said spanning portions of the first and second flanges are squeezed in said recesses to seal said chamber.

2. The power element of claim 1 wherein the spanning portion of the first sealing flange includes a marginal bead, and said securing means squeezes the bead in said first recess.

3. The power element of claim 2 including a first groove formed in said first recess which receives said bead, said bead being squeezed in said first groove by said securing means during assembly of said power element.

4. The power element of claim 2 wherein said first recess is a counterbore, and said counterbore and first groove are both formed in said guide member.

5. The power element of claim 3 wherein said first groove and first recess are both formed in said guide member.

6. The power element of claim 3 wherein the first abutting surface of the spacer member has a second groove formed therein in alignment with the first groove formed in said first recess, and said securing means squeezes the bead in both of said grooves.

7. The power element of claim 6 wherein the first abutting surface of the spacer member and the abutting surface of the guide member contact outwardly of the bead during assembly of the power element.

8. The power element of claim 1 wherein an anti-extrusion plate is positioned in the first recess to overlie a portion of the first sealing flange, said plate contacting the guide member and cooperating with said guide member and said spacer member to squeeze the first sealing flange therebetween during assembly of said power element, and said plate has an aperture therein in alignment with the bore of the guide member to permit reciprocable movement of the plunger therein during operation of the power element.

9. The power element of claim 2 including an anti-extrusion plate positioned in the first recess and overlying a portion of the first sealing flange, said plate contacting the guide member and cooperating with the guide member and the spacer member to squeeze the first sealing flange therebetween during assembly of the power element, said plate having an aperture therein in alignment with the bore of the guide member to permit reciprocable movement of the plunger therein during operation of the power element.

10. The power element of claim 1 wherein said spacer member is a plate, the second abutting surface of the plate has an annular flange depending therefrom, said flange being formed inwardly of the marginal edge of the plate, and the abutting surface of the casing has a groove formed in the recessed portion thereof in a location between the inner and outer edges of the recess, whereby squeezing of the second sealing flange during assembly of the power element deforms the second sealing flange to form a bead squeezed in the groove of the casing, and the plate, plate flange and casing cooperate to form a reduced neck portion from the sealing flange in a location inwardly of the bead.

11. The power element of claim 2 wherein said spacer member is a plate, the second abutting surface of the plate has an annular flange depending therefrom, said flange being formed inwardly of the marginal edge of the plate, and the abutting surface of the casing has a groove formed in the recessed portion thereof in a location between the inner and outer edges of the recess, whereby squeezing of the second sealing flange during assembly of the power element deforms the second sealing flange to form a bead squeezed in the groove of the casing, and the plate, plate flange and casing cooperate to form a reduced neck portion from the sealing flange in a location inwardly of the bead.

12. The power element of claim 1 wherein a portion of the diaphragm which connects the first and second sealing flanges is located in the bore of the spacer member.

13. The power element of claim 2 wherein a portion of the diaphragm which connects the first and second flanges is located in the bore of the spacer member.

14. The power element of claim 10 wherein the plate aperture is of lesser diameter than the diameter of the chamber of the casing.

15. The power element of claim 11 wherein the plate aperture is of lesser diameter than the diameter of the chamber of the casing.

16. The power element of claim 1 wherein said guide means includes an outturned flange having said abutting surface, and said securing means includes an inturned flange on said casing which traps said guide member and spacer member to assemble the power element.

17. The power element of claim 1 wherein said securing means comprises a separate sleeve, said sleeve trapping the casing and guide member therebetween to assemble the power element.

18. The power element of claim 1 wherein the first sealing flange is of lesser cross-sectional dimension than the second sealing flange.

19. The power element of claim 1 wherein the diaphragm comprises a conical extension carrying the first and second flanges in spaced relation, said second flange spanning the open end of the chamber and said conical extension extending into the chamber and terminating adjacent the end of the casing chamber opposite the open end thereof, said diaphragm extension having a bore therein for receiving the plunger.

20. The power element of claim 2 wherein the diaphragm comprises a conical extension carrying the first and second flanges in spaced relation, said second flange spanning the open end of the chamber and said conical extension extending into the chamber and terminating adjacent the end of the casing chamber opposite the open end thereof, said diaphragm extension having a bore therein for receiving the plunger.

21. The power element of claim 7 wherein the diaphragm comprises a conical extension carrying the first and second flanges in spaced relation, said second flange spanning the open end of the chamber and said conical extension extending into the chamber and terminating adjacent the end of the casing chamber opposite the open end thereof, said diaphragm extension having a bore therein for receiving the plunger.

22. The power element of claim 10 wherein the diaphragm comprises a conical extension carrying the first and second flanges in spaced relation, said second flange spanning the open end of the chamber and said conical extension extending into the chamber and terminating adjacent the end of the casing chamber opposite the open end thereof, said diaphragm extension having a bore therein for receiving the plunger.

23. The power element of claim 11 wherein the diaphragm comprises a conical extension carrying the first and second flanges in spaced relation, said second flange spanning the open end of the chamber and said conical extension extending into the chamber and terminating adjacent the end of the casing chamber opposite the open end thereof, said diaphragm extension having a bore therein for receiving the plunger.

24. A force transmitting member for use in power elements of the squeeze push type comprising an elongated body portion having a plunger bore therein terminating inwardly of one end of the body, and a first sealing flange and a second sealing flange carried by the body portion in spaced relation adjacent the open end of the bore.

25. The member of claim 24 wherein the first sealing flange is positioned nearer to one end of the body portion than the second sealing flange and the first sealing flange carries a marginal sealing bead.

26. The member of claim 25 wherein the body portion is conical, the flanges are annular, and the bead is an annular bead.

References Cited in the file of this patent

FOREIGN PATENTS 885,242      Great Britain _____ Dec. 26, 1961